(12) United States Patent
Halén et al.

(10) Patent No.: US 11,663,052 B2
(45) Date of Patent: May 30, 2023

(54) ADAPTIVE APPLICATION ASSIGNMENT TO DISTRIBUTED CLOUD RESOURCES

(71) Applicant: Telefonaktiebolaget LM Ericsson (publ), Stockholm (SE)

(72) Inventors: Joacim Halén, Sollentuna (SE); Chunyan Fu, Pointe-Claire (CA); Mina Sedaghat, Solna (SE); Wolfgang John, Haninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 16/960,523

(22) PCT Filed: Jan. 4, 2019

(86) PCT No.: PCT/SE2019/050005
§ 371 (c)(1),
(2) Date: Jul. 7, 2020

(87) PCT Pub. No.: WO2019/135704
PCT Pub. Date: Jul. 11, 2019

(65) Prior Publication Data
US 2020/0371846 A1 Nov. 26, 2020

Related U.S. Application Data

(60) Provisional application No. 62/614,586, filed on Jan. 8, 2018.

(51) Int. Cl.
*G06F 9/50* (2006.01)
*H04L 67/1023* (2022.01)

(52) U.S. Cl.
CPC .......... *G06F 9/5083* (2013.01); *G06F 9/5027* (2013.01); *H04L 67/1023* (2013.01)

(58) Field of Classification Search
None
See application file for complete search history.

(56) References Cited

U.S. PATENT DOCUMENTS 4,727,487 A * 2/1988 Masui ...................... G06F 9/50
706/57
6,766,348 B1 * 7/2004 Combs .................. G06F 9/5083
709/228

(Continued)

OTHER PUBLICATIONS

Delimitrou et al., "Tarcil: Reconciling scheduling speed and quality in large, shared clusters", Tech. rep., Stanford University, Nov. 2014. Computer Science Technical Report CSTR May 2014, pp. 1-14.

(Continued)

*Primary Examiner* — Adam Lee
(74) *Attorney, Agent, or Firm* — Nicholson De Vos Webster & Elliott LLP

(57) ABSTRACT

A method for allocating resources to applications in a distributed datacenter based on generated contact lists is described. The method includes, receiving, by a first resource manager, a placement request, which identifies resources needed for execution of an application; determining a policy associated with the application; generating a first contact list for the first resource manager based on the determined policy for the application; and searching resources in the distributed datacenter, based on the first contact list, to attempt to meet the identified resources of the placement request.

20 Claims, 11 Drawing Sheets

(56) References Cited

U.S. PATENT DOCUMENTS

| | | | |
|---|---|---|---|
| 7,703,102 B1* | 4/2010 | Eppstein | H04L 67/1012 718/100 |
| 9,081,617 B1 | 7/2015 | Pendharkar et al. | |
| 9,621,427 B1 | 4/2017 | Shah et al. | |
| 10,007,555 B1* | 6/2018 | Kuhne | G06F 9/445 |
| 2001/0033646 A1* | 10/2001 | Porter | H04Q 3/66 379/221.01 |
| 2002/0059306 A1* | 5/2002 | Leymann | G06F 11/1471 |
| 2005/0071720 A1* | 3/2005 | Dattaram Kadkade | G06F 30/3323 714/741 |
| 2005/0081208 A1* | 4/2005 | Gargya | G06F 9/4881 718/100 |
| 2006/0117041 A1* | 6/2006 | Ayres | H04L 67/1014 |
| 2006/0190605 A1* | 8/2006 | Franz | G06Q 10/06315 709/226 |
| 2006/0236358 A1* | 10/2006 | Liu | H04N 21/47202 348/E7.071 |
| 2007/0033282 A1* | 2/2007 | Mao | H04N 21/26208 709/226 |
| 2007/0136470 A1* | 6/2007 | Chikkareddy | G06F 9/454 704/8 |
| 2007/0168244 A1* | 7/2007 | Dan | G06Q 10/06393 705/7.38 |
| 2007/0250335 A1* | 10/2007 | Hodges | G06Q 10/0633 705/7.27 |
| 2008/0244600 A1* | 10/2008 | Wong | G06F 9/5022 718/104 |
| 2011/0307899 A1* | 12/2011 | Lee | G06F 9/5027 703/22 |
| 2012/0054763 A1* | 3/2012 | Srinivasan | G06F 9/5083 718/104 |
| 2012/0063411 A1* | 3/2012 | Su | H04L 5/0016 370/329 |
| 2012/0102369 A1* | 4/2012 | Hiltunen | G06F 11/008 714/48 |
| 2013/0097464 A1* | 4/2013 | Ahmad | G06F 11/0751 714/E11.144 |
| 2013/0138767 A1* | 5/2013 | Vecera | H04L 67/567 709/217 |
| 2013/0226638 A1* | 8/2013 | Colvard | G06Q 10/06 705/7.14 |
| 2013/0263120 A1 | 10/2013 | Patil et al. | |
| 2013/0283286 A1* | 10/2013 | Lee | G06F 9/5027 718/104 |
| 2014/0006626 A1* | 1/2014 | Breiter | H04L 41/5041 709/226 |
| 2014/0006627 A1* | 1/2014 | Arwe | H04L 41/046 709/226 |
| 2014/0012995 A1* | 1/2014 | Zhang | H04L 41/0806 709/226 |
| 2014/0039990 A1* | 2/2014 | Georgi | G06Q 30/0229 705/14.3 |
| 2014/0115597 A1* | 4/2014 | Schmit | G06F 9/505 718/104 |
| 2014/0173620 A1* | 6/2014 | Chai | G06F 9/5005 718/104 |
| 2014/0282586 A1* | 9/2014 | Shear | G06F 16/245 718/104 |
| 2014/0289417 A1* | 9/2014 | Chan | H04W 4/60 709/226 |
| 2014/0331235 A1* | 11/2014 | Lee | G06F 9/5027 718/104 |
| 2015/0172204 A1* | 6/2015 | Anderson | H04L 43/08 709/224 |
| 2015/0256475 A1* | 9/2015 | Suman | H04L 47/70 709/226 |
| 2016/0034305 A1* | 2/2016 | Shear | H04L 47/70 707/722 |
| 2016/0301624 A1* | 10/2016 | Gonzalez | G06F 9/5083 |
| 2017/0078409 A1 | 3/2017 | Yazir et al. | |
| 2017/0097851 A1* | 4/2017 | Chen | G06F 9/45558 |
| 2017/0357532 A1* | 12/2017 | Miraftabzadeh | G06F 9/5083 |
| 2018/0143855 A1* | 5/2018 | Kim | G06F 9/4881 |
| 2018/0145923 A1* | 5/2018 | Chen | H04L 47/70 |
| 2018/0176311 A1* | 6/2018 | Sharma | H04L 67/18 |

OTHER PUBLICATIONS

Hindman et al., "Mesos: A platform for fine-grained resource sharing in the data center", Proceedings of 8th USENIX Symposium on Networked Systems Design and Implementation (NSDI) (2011), USENIX Association, pp. 295-308.

Isard et al., "Quincy: fair scheduling for distributed computing clusters", Proceedings of the ACM SIGOPS 22nd Symposium on Operating Systems Principles, Oct. 2009, pp. 261-276.

Jennings et al., "Resource Management in Clouds: Survey and Research Challenges", Journal of Network and Systems Management, Jul. 2015, vol. 23, Issue 3, pp. 567-619.

Ousterhout et al., "Sparrow: Distributed, Low Latency Scheduling", Proceedings of the 24th ACM Symposium on Operating Systems Principles (SOSP '13), Nov. 3-6, 2013, pp. 69-84.

Schwarzkopf et al., "Omega: flexible, scalable schedulers for large compute clusters", Proceedings of the 8th ACM European Conference on Computer Systems, EuroSys '13, Apr. 15-17, 2013, pp. 351-364.

Verma et al., "Large-scale cluster management at Google with Borg", Proceedings of the Tenth European Conference on Computer Systems, EuroSys '15, ACM, Apr. 21-24, 2015, pp. 1-18.

International Search Report and Written Opinion for Application No. PCT/SE2019/050005, dated Apr. 5, 2019, 12 pages.

Communication pursuant to Article 94(3) EPC, EP App. No. 19700630.7, dated Aug. 12, 2022, 12 pages.

International Preliminary Report on Patentability, PCT App. No. PCT/SE2019/050005, dated Jul. 23, 2020, 10 pages.

Sedaghat et al., "Autonomic Resource Allocation for Cloud Data Centers: A Peer to Peer Approach", 2014, pp. 131-140, 2014 IEEE International Conference on Cloud and Autonomic Computing.

Sedaghat et al., "Decentralized cloud datacenter reconsolidation through emergent and topology-aware behavior", 2015, pp. 51-63, Future Generation Computer Systems, vol. 56.

Sedaghat, "Cluster Scheduling and Management for Large-Scale Compute Clouds", 2015, 190 pages, PHD Thesis, Department of Computer Science, UMEA University, Sweden.

* cited by examiner

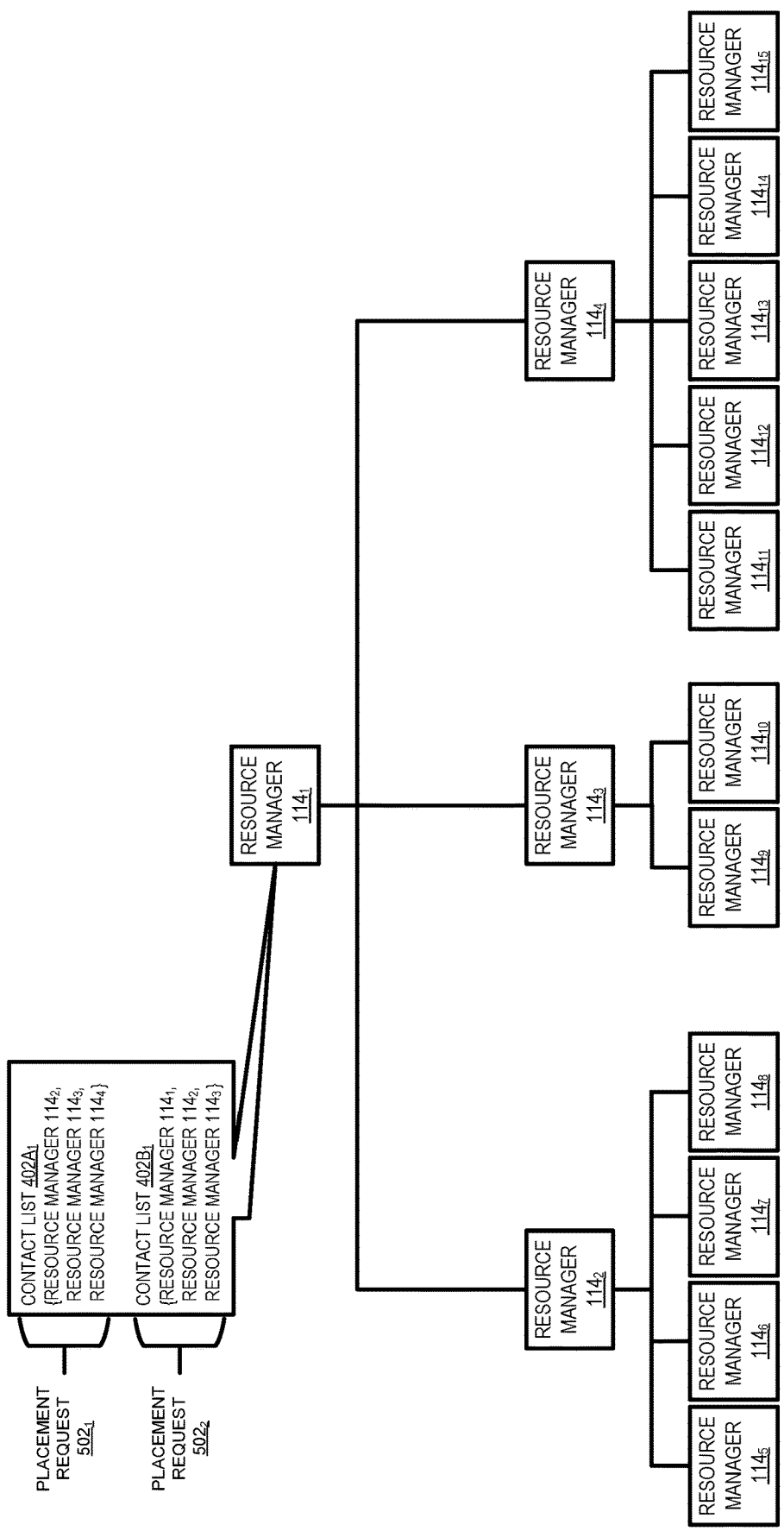

ADAPTIVE APPLICATION ASSIGNMENT TO DISTRIBUTED CLOUD RESOURCES

CROSS-REFERENCE TO RELATED APPLICATIONS

This application is a National stage of International Application No. PCT/SE2019/050005, filed Jan. 4, 2019, which claims the benefit of U.S. Provisional Application No. 62/614,586, filed Jan. 8, 2018, which are hereby incorporated by reference.

TECHNICAL FIELD

Embodiments of the invention relate to the field of datacenter management; and more specifically, to decentralized and distributed resource management in cloud infrastructures through the use of contact lists generated based on workload types or discovery policies associated with applications.

BACKGROUND ART

Datacenters are built to exploit economies of scale and are thus often constructed out of hundreds of thousands of physical machines/servers. Resources in these datacenters are statically partitioned into pre-defined, fixed clusters of servers. A centralized resource controller dynamically allocates resources for each cluster in response to resource requests from incoming tasks/jobs. For example, if an application transmits a resource request for a set of resources (e.g., four cores and one-gigabyte of memory) to a cluster, the centralized resource controller of the cluster determines a resource assignment for the request based on available resources in the cluster. Such centralized resources controllers continually monitor, collect, and process server states across the datacenter and make scheduling decisions in a sequential order. Clusters are fixed/limited in size for a variety of reasons, including the fact that centralized resource controllers, which manage resources in these clusters, do not feasibly scale beyond those limits as the computational overhead and response times become too large. Further, latency and throughput requirements require these resource controllers to be proximate to servers within the cluster, which prevents geographic dispersion of servers in a single cluster. Moreover, clusters operate independently and without interaction with other clusters (e.g., a resource manager of a first cluster works independently and without interaction with a resource manager of a second cluster. Thus, current static resource management frameworks which rely on resource managers that are independent from each other cannot efficiently scale with the introduction of more resources/servers to clusters. Examples of such resource management frameworks are Google's Borg or Microsoft's Quincy resource managers.

SUMMARY

A method for allocating resources to applications in a distributed datacenter based on generated contact lists is described. The method includes receiving, by a first resource manager, a placement request, which identifies resources needed for execution of an application; determining a policy associated with the application; generating a first contact list for the first resource manager based on the determined policy for the application; and searching resources in the distributed datacenter, based on the first contact list, to attempt to meet the identified resources of the placement request.

A non-transitory machine-readable storage medium that provides instructions that, if executed by a processor, will cause said processor to perform operations is described. The operations include receiving a placement request, which identifies resources needed for execution of an application; determining a policy associated with the application; generating a first contact list for a first resource manager based on the determined policy for the application; and searching resources in a distributed datacenter, based on the first contact list, to attempt to meet the identified resources of the placement request.

A system for allocating resources to applications in a distributed datacenter based on generated contact lists is described. The system includes a memory unit that stores instructions; and a processor coupled to the memory unit to execute the instructions. The instructions are to cause the system to receive a placement request, which identifies resources needed for execution of an application; determine a policy associated with the application; generate a first contact list for a first resource manager based on the determined policy for the application; and search resources in the distributed datacenter, based on the first contact list, to attempt to meet the identified resources of the placement request.

As described above, the datacenter system is based on a decentralized management framework, comprising a collection of collaborative resource managers that is each associated with a set of resource units (e.g., a set of cores/processors, segments of memory, servers, racks, etc.). In such a system, each distributed resource manager does not rely on a unique global view of the datacenter system. Instead, each resource manager maintains a local view of its environment and uses its local view to make local decisions regarding resource unit assignment/reservation/allocation. Each resource manager may also rely on a logical overlay for resource unit assignment/reservation/allocation that is based on a collaboration between resource managers. The logical overlay defines and establishes the connectivity between the resource managers and acts as a communication graph between the resource managers. Each resource manager, at a given time, only knows about a set of other resource managers defined by a contact list, which is generated based on a workload type or policy of an application and optionally an objective of the datacenter system. Resource managers logically connected to each other shape a neighborhood, which is an alternative to the static partitions used by centralized controllers. The grouping of resource managers enables seamless pooling of the resources to applications with resource requirements larger than resources in a single server or a single resource manager.

BRIEF DESCRIPTION OF THE DRAWINGS

The invention may best be understood by referring to the following description and accompanying drawings that are used to illustrate embodiments of the invention. In the drawings:

FIG. 5 shows placement requests associated with different contact lists for the same resource manager, according to one example embodiment.

DETAILED DESCRIPTION

The following description describes methods and apparatus for decentralized and distributed resource management in cloud infrastructures through the use of contact lists generated based on workload types or discovery policies associated with applications. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the systems, devices, methods, and articles of manufacture described herein may be practiced without such specific details. In other instances, control structures, gate level circuits and full software instruction sequences have not been shown in detail in order not to obscure the embodiments described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
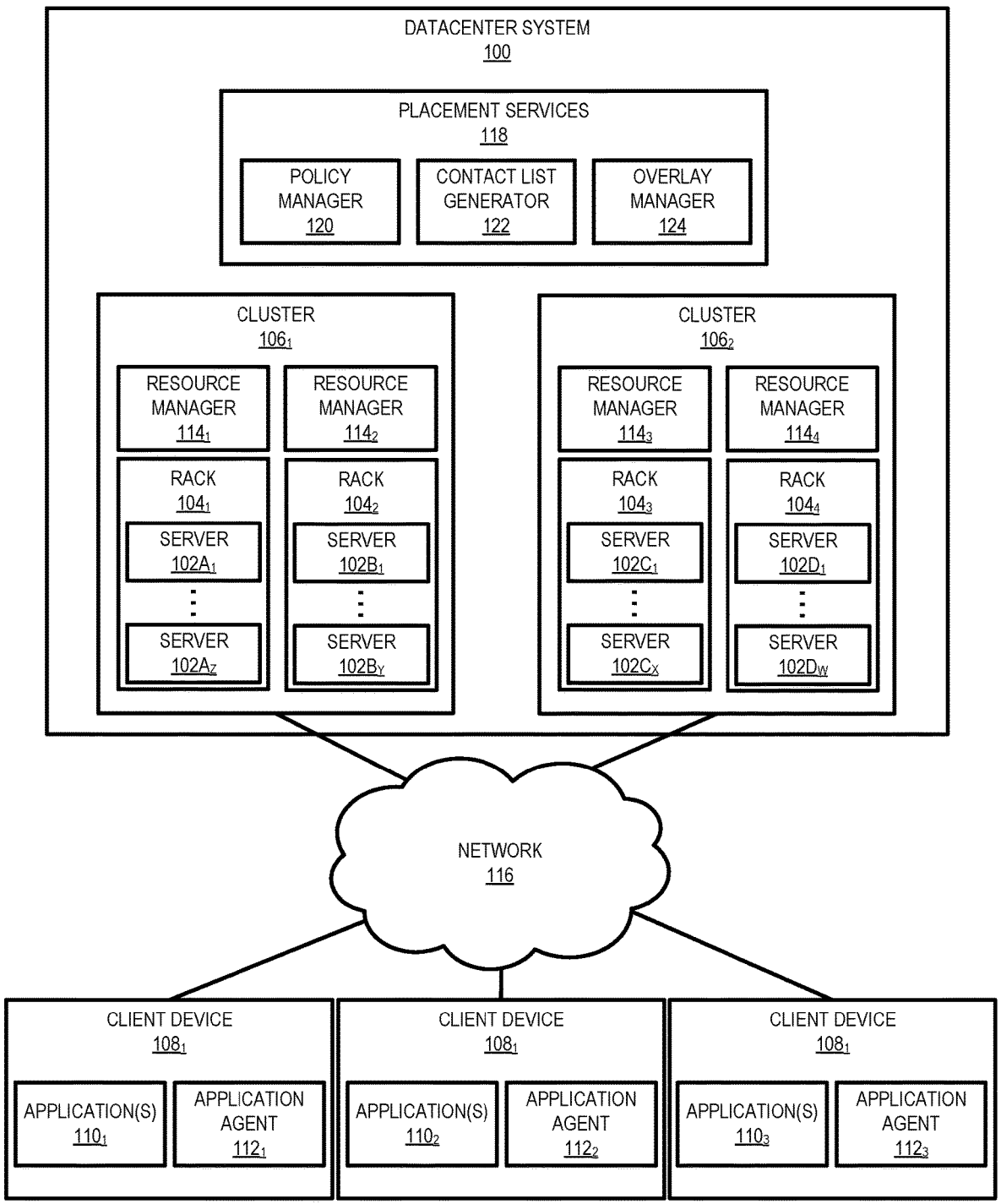
FIG. 1 shows a datacenter system for decentralized and distributed resource management in a cloud infrastructure through the use of contact lists generated based on workload types or discovery policies associated with applications, according to one example embodiment.

FIG. 1 shows a datacenter system 100 for decentralized and distributed resource management in a cloud infrastructure through the use of contact lists generated based on workload types or discovery policies associated with applications, according to one example embodiment. As shown in FIG. 1, the datacenter system 100 includes sets of servers 102 that may be statically arranged into particular configurations. For example, a first set of servers $102A_1$-$102A_Z$ may be arranged in a first rack $104_1$, a second set of servers $102B_1$-$102B_Y$ may be arranged in a second rack $104_2$, a third set of servers $102C_1$-$102B_X$ may be arranged in a third rack $104_3$, and a fourth set of servers $102D_1$-$102B_W$ may be arranged in a fourth rack $104_4$. As used herein, a rack 104 (sometimes referred to as a server rack 104) is an equipment structure that is designed to hold multiple servers 102 in associated bays of the rack 104.

The racks 104 may be further grouped into clusters 106 (e.g., the racks $104_1$ and $104_2$ are grouped into a first cluster $106_1$ while the racks $104_3$ and $104_4$ are grouped into a second cluster $106_2$). The organization/grouping of servers 102 into racks 104 and clusters 106 may correspond to physical proximity of the servers 102. For example, all servers 102 in the same cluster 106 may be installed in the same building/location. For instance, each of the servers 102 within a cluster 106 are communicatively coupled together in a single physical location. Accordingly, the servers $102A_1$-$102A_Z$ and $102B_1$-$102B_Y$ in the first cluster $106_1$ are at a first location while the servers $102C_1$-$102C_X$ and $102D_1$-$102D_W$ in the second cluster $106_2$ are at a second location. This physical arrangement of servers 102 is static and cannot be easily manipulated/altered, and particularly cannot be easily or quickly manipulated/altered to meet demands of applications.

Although shown with two clusters 106 that each include two racks 104 of servers 102, in other embodiments, the number of clusters 106, racks 104, and servers 102 in the datacenter system 100 may be different. In some cases, one or more clusters 106, racks 104, and/or servers 102 may be added to or removed from the datacenter system 100 periodically during normal operation of the datacenter system 100. Accordingly, the configuration of the datacenter system 100 shown in FIG. 1 is for illustrative purposes. However, although the physical configuration and/or arrangement of clusters 106, racks 104, and/or servers 102 may alter over time, the overlay structure, which will be described herein, provides a dynamic and flexible structure for decentralized resource management in a cloud infrastructure. This overlay structure supports efficient resource scheduling and placement by providing distributed resource schedulers/managers a seamless view of the system 100 via the contact lists that are tailored to their scheduling needs and policies.

A server 102, as used herein, is an electronic device that provides resources for applications in a client-server model. The resources provided by the servers 102 may include items to support processing/execution of the applications, such as physical or logical processors and/or cores and memory. For example, the client devices $108_1$-$108_3$ may each include one or more corresponding applications $110_1$-$110_3$, which each require a set of resources for processing/execution. The applications $110_1$-$110_3$, which may alternatively be processes, are computer software designed to perform a group of coordinated functions, tasks, or activities. The applications $110_1$-$110_3$ may be managed by respective application agents $112_1$-$112_3$, that ensure a set of resources are allocated for processing/execution of their respective applications $110_1$-$110_3$. Each of the client devices $108_1$-$108_3$ may be coupled to the datacenter system 100 via the network 116 such that the application agents $112_1$-$112_3$ may request the datacenter system 100 reserve/allocate a set of resources for processing/execution of their respective applications $110_1$-$110_3$.

For example, as will be described in greater detail below, the application agent $112_1$ may determine a set of resources needed by the application $110_1$ (e.g., a number of cores and/or an amount of memory necessary for execution of the application $110_1$). The determination of the set of resources may be based on a service level agreement between a client of the client device $108_1$ and an operator of the datacenter system 100, which defines performance parameters for execution of the application $110_1$ using the datacenter system 100. Accordingly, the set of resources are determined to meet the requirements of the service level agreement. Alternatively, or in addition to meeting the requirements of the service level agreement, the set of resources may be determined by the application agent $112_1$ based on an expected/estimated demand of the application $110_1$.

Based on this determined set of resources, the application agent $112_1$ may generate and transmit a placement request to an associated resource manager 114 in the datacenter system 100. For example, the application agent $112_1$ may be pre-configured or dynamically configured to be associated with the resource manager $114_1$. In this configuration, the placement request generated by the application agent $112_1$ is transmitted to the resource manager $114_1$. The placement request indicates the set of resources that were determined by the application agent $112_1$ to be needed for the application $110_1$ and requests corresponding allocation/reservation of resources in the datacenter system 100.

In response to receipt of the placement request with an indicated set of resources, the resource manager $114_1$ may utilize the placement services 118 along with one or more of the other resource managers $114_2$ and $114_3$ for allocation/reservation of resources in the datacenter system 100. In particular, the resource managers $114_1$-$114_3$ together with the placement services 118 may implement a dynamic overlay structure that allows resource allocation/reservation to not be constricted by the static/physical partitioning of servers 102 into racks 104 and/or clusters 106. Accordingly, the structure provides a seamless view of the underlying hardware regardless of their physical locations.

In particular, each of the resource managers 114 has an understanding/view of the servers 102 that they monitor/control (i.e., a local view). For example, the resource manager $114_1$ monitors the capabilities and reserved/allocated resources of the servers $102A_1$-$102A_Z$ but does not monitor or otherwise have knowledge of the capabilities and reserved/allocated resources of the servers $102B_1$-$102B_Y$, $102C_1$-$102B_X$, and $102D_1$-$102B_W$. Thus, in response to a placement request from the application agent $112_1$ corresponding to the application $110_1$, the resource manager $114_1$ can determine whether available resources of the servers $102A_1$-$102A_Z$ can meet the set of resources indicated in the placement request.

When the resource manager $114_1$ determines that the available resources of the servers $102A_1$-$102A_Z$ cannot fully meet the set of resources indicated in the placement request, the resource manager $114_1$ may begin the process of inquiring other resource managers 114 (e.g., one or more of the resource managers $114_2$ and $114_3$) to assist in fulfilling the placement request. For example, in some embodiments, the resource manager $114_1$ may inquire or otherwise retrieve a workload type or a discovery policy associated with the application $110_1$. In particular, each application $110_1$-$110_3$ is associated with a workload type or a discovery policy, which is tracked by the policy manager 120. The resource manager $114_1$ retrieves the workload type or discovery policy associated with the application $110_1$ from the policy manager 120 and determines a contact list based on this workload type or discovery policy. The contact list may be generated by the contact list generator 122 with reference to the connections between resources managers 114 tracked by the overlay manager 124 and indicates the resource managers 114 to inquire regarding fulfillment of the placement request.

For example, if the application $110_1$ has a large number of processes and is associated with a policy with anti-affinity rules stating that the processes cannot be placed/executed together (i.e., executed in the same server 102 or rack 104), it may not make sense to create and repeatedly search for resource fulfillment in small neighborhoods, which would be represented by a short/small contact list. In particular, a small neighborhood reduces parallelization of processes in the application $110_1$ amongst several servers 102. It may also increase the discovery time if the resources cannot be found locally. Having a short contact list forces the datacenter system 100 to iteratively search in multiple small neighborhoods after each failed search attempt and consequently results in a long discovery time (i.e., a long scheduling time).

In this scenario, it makes more sense for the datacenter system 100 to have a larger search space, having a higher visibility to the infrastructure, and therefore requiring a longer/larger contact list to expand the search space. Accordingly, a policy associated with the application $110_1$ in this scenario would indicate use of a large contact list.

In another example, the application $110_1$ may have specific resource requirements (e.g. Field-Programmable Gate Arrays (FPGAs)) that only a specific set of resources from a particular set of servers 102 can serve. In this scenario, the datacenter system 100 may want to communicate with the target group of resource managers 114 associated with these resources, within a few hops and without traversing the whole datacenter system 100 structure. Therefore, a policy associated with the application $110_1$ in this example scenario may indicate the use of a specific set of resources such that the contact list generator 122 (with support from the overlay manager 124 to indicate the location/connections for these specific resources) can generate a targeted/small contact list for scheduling processing of the application $110_1$.

After inquiring with other resource managers 114 regarding fulfillment of the placement request (using one or more inquiries), the resource manager $114_1$ may determine if the search for resources was successful (i.e., resources were found/reserved in the datacenter system 100 for the application $110_1$) or unsuccessful (i.e., resources were not entirely found/reserved in the datacenter system 100 for the application $110_1$). In some embodiments, the search is regarded as unsuccessful if the requested resources are not found after a certain number of searches or after a certain time period has elapsed. This can be decided by using a timer corresponding to a total time to fulfill the placement request, a search counter corresponding to the number of search iterations between levels of resource managers 114, a time-to-live counter corresponding to each search iteration, etc. The timer or counter values can be configurable and may be optionally the same for all search combinations.

As summarized above and as will be described in greater detail below, the datacenter system 100 is based on a decentralized management framework, comprising a collection of collaborative resource managers 114 (sometimes referred to as placement agents) that is each associated with a resource unit (e.g., a core/processor, a segment of memory, a server 102, a rack 104, etc.). In such a system, each distributed resource manager 114 does not rely on a unique global view of the datacenter system 100. Instead, each resource manager 114 maintains a local view of its environment and uses its local view to make local decisions regarding resource unit assignment/reservation/allocation. Since this is a logical view, it can be generated dynamically to support placement request requirements and reflects resource availability in the datacenter system 100. The resource allocation in such a system 100 is the result of collaboration between multiple resource managers 114. The resource managers 114 are working together to place an incoming workload so that an overall cloud infrastructure objective (e.g., high utilization of resources, low degree service level agreement violations, etc.) is fulfilled. The distributed structure and distribution of management tasks among multiple resource managers 114 improves parallelization and results in higher throughput and lower scheduling latency.

For such a framework to function, the resource managers 114 need to be structured into a logical overlay. The logical overlay defines and establishes the connectivity between the resource managers 114 and acts as a communication graph between the resource managers 114. Each resource manager 114, at a given time, only knows about a set of other resource managers 114 defined by a contact list. Resource managers 114 logically connected to each other shape a neighborhood, which is an alternative for the static partitions used by centralized controllers. The grouping of resource managers 114 enables seamless pooling of the resources to applications 110 with resource requirements larger than resources in a single server 102. The resource managers 114 connected to each other communicate via a common message bus.

Within the distributed resource management framework, the resource scheduling and placement problem is translated into a resource discovery problem, where the resource manager 114, who initially receives the placement request, searches within the logical overlay for the available resources to assign/reserve for applications 110. Accordingly, the logical overlay, in principle, is a communication graph, and thus there are multiple ways to partition the graph and traverse/search the graph. For example, in a tree structured logical overlay, a resource manager 114 can search the tree, breadth first, depth first, bottom-up, top-down, or prioritize different branches of the tree over each other. The logical overlay shapes the resource manager's 114 view of the datacenter system 100 and the searching algorithm has a direct impact on scheduling latency and possibly other placement performance metrics such as overall utilization and energy efficiency.

The search algorithm relies heavily on how each resource manager 114 perceives its neighbors, or in other words, the resource manager's 114 contact list. This is because at any given time, a resource manager 114 only knows about its own contact list (i.e., its own contact/neighbors) plus the resources directly available to this resource manager 114. Therefore, it is crucial to have a mechanism to generate contact lists that can support scheduling requirements. In particular, it is important to dynamically configure the contact list generation based on different requirements of applications 110 or different scheduling or infrastructure policies of the application 110.

Figure 2:
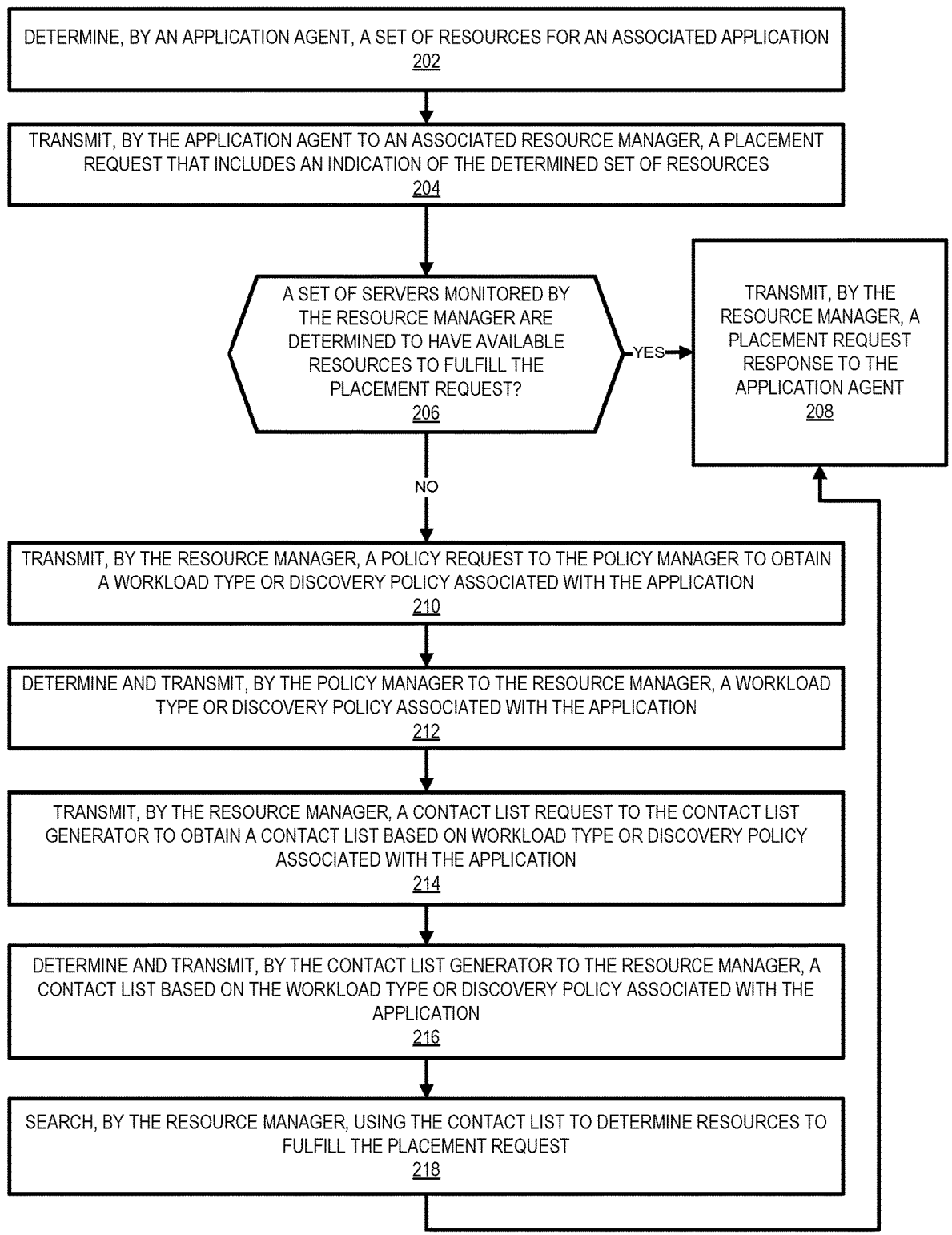
FIG. 2 shows a flow diagram, which describes a method for allocating resources to applications based on generated contact lists, according to one example embodiment.

Turning now to FIG. 2, a flow diagram which describes a method 200 for allocating resources to applications based on generated contact lists will be described, according to one example embodiment. The operations in the flow diagram will be described with reference to the exemplary embodiments of the other figures. In particular, the method 200 will be described in relation to the components of FIG. 1 and the data flow diagrams of FIGS. 3A and 3B, in addition to other figures. However, it should be understood that the operations of the flow diagram can be performed by embodiments other than those discussed with reference to the other figures, and the embodiments discussed with reference to these other figures can perform operations different than those discussed with reference to the flow diagrams.

As shown in FIG. 2, the method 200 may begin with the application agent $112_1$ determining a set of resources for use by an associated application at operation 202. For example, the application agent $112_1$ is associated with the application $110_1$ and may determine at operation 202 a set of resources needed by the application $110_1$ for execution (e.g., a number of cores and/or an amount of memory necessary for execution of the application $110_1$). The determination of the set of resources may be based on a service level agreement between a client of the client device $108_1$ and an operator of the datacenter system 100, which defines performance parameters for execution of the application $110_1$ using the datacenter system 100. For example, the application agent $112_1$ may determine that the application $110_1$ requires two cores and four gigabytes of main memory to meet the requirements of the service level agreement between the client of the client device $108_1$ and the operator of the datacenter system 100.

Based on this determined set of resources, the application agent $112_1$ may generate and transmit a placement request to an associated resource manager in the datacenter system 100 at operation 204. For example, the application agent $112_1$ may be preconfigured to be associated with the resource manager $114_1$. In this configuration, the placement request generated by the application agent $112_1$ is transmitted at operation 204 to the resource manager $114_1$. The placement request indicates the set of resources that were determined by the application agent $112_1$ to be needed for the application $110_1$ and requests corresponding allocation/reservation of resources in the datacenter system 100. Using the example described above, the placement request identifies that the application $110_1$ requires two cores and four gigabytes of main memory and requests allocation/reservation of these resources in the datacenter system 100. Although described herein in relation to allocation/reservation of processors, cores, and memory, allocation/reservation may be performed relative to any resource unit. For example, allocation/reservation may be made in relation to a set of one or more servers 102, a set of one or more racks 104, etc.

Figure 3A:
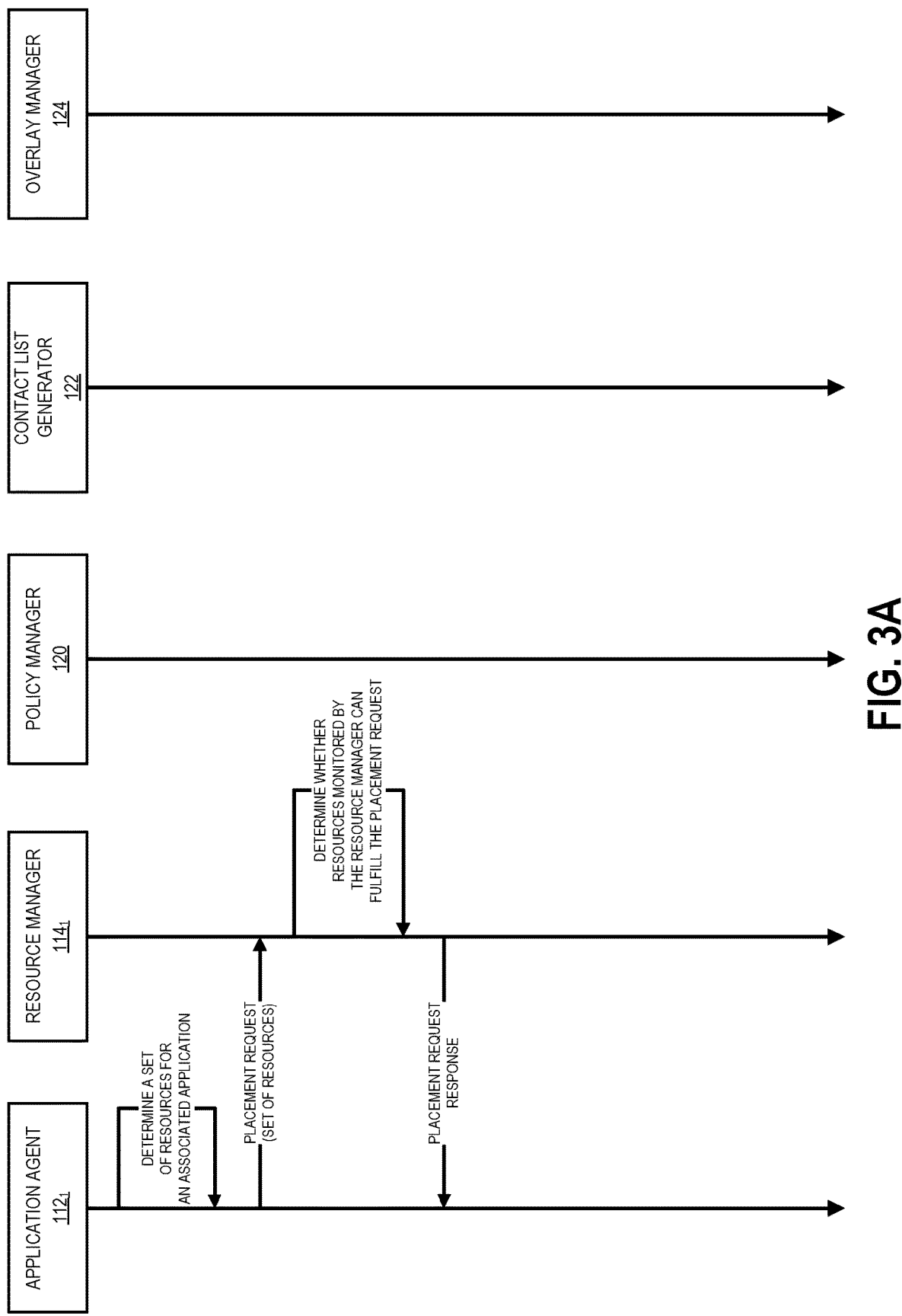
FIG. 3A shows a data flow diagram in which a resource manager, which originally received a placement request form an application agent, fulfilling the placement request, according to one example embodiment.

In response to receipt of the placement request with an indicated set of resources, the resource manager $114_1$ may determine at operation 206 whether the servers $102_1$-$102_Z$ monitored by the resource manager $114_1$ can fulfill the placement request. In particular, the resource manager $114_1$ determines whether the servers $102_1$-$102_Z$ have enough available resources to meet the set of resources indicated in the placement request. In the example described above, the resource manager $114_1$ determines if the servers $102_1$-$102_Z$ collectively have two cores and four gigabytes of main memory available for reservation for the application $110_1$. This initial determination at operation 206 involves the local view maintained by the resource manager $114_1$ for the servers $102_1$-$102_Z$. In response to determining that the servers $102_1$-$102_Z$ can fulfill the placement request, the resource manager $114_1$ reserves the resources in the corresponding servers $102_1$-$102_Z$ and transmits a placement request response to the application agent $112_1$ at operation 208. FIG. 3A is a flow diagram, according to one example embodiment, showing when the resource manager $114_1$ (i.e., the resource manager 114 that receives the initial placement request from the application agent 112) is able to fulfill the placement request using resources monitored by the resource manager $114_1$. As shown in FIG. 3A, the resource manager $114_1$ returns a placement request response to the application agent $112_1$ without interaction with the placement services 118 (i.e., the policy manager 120, the contact list generator 122, and the overlay manager 124).

Figure 3B:
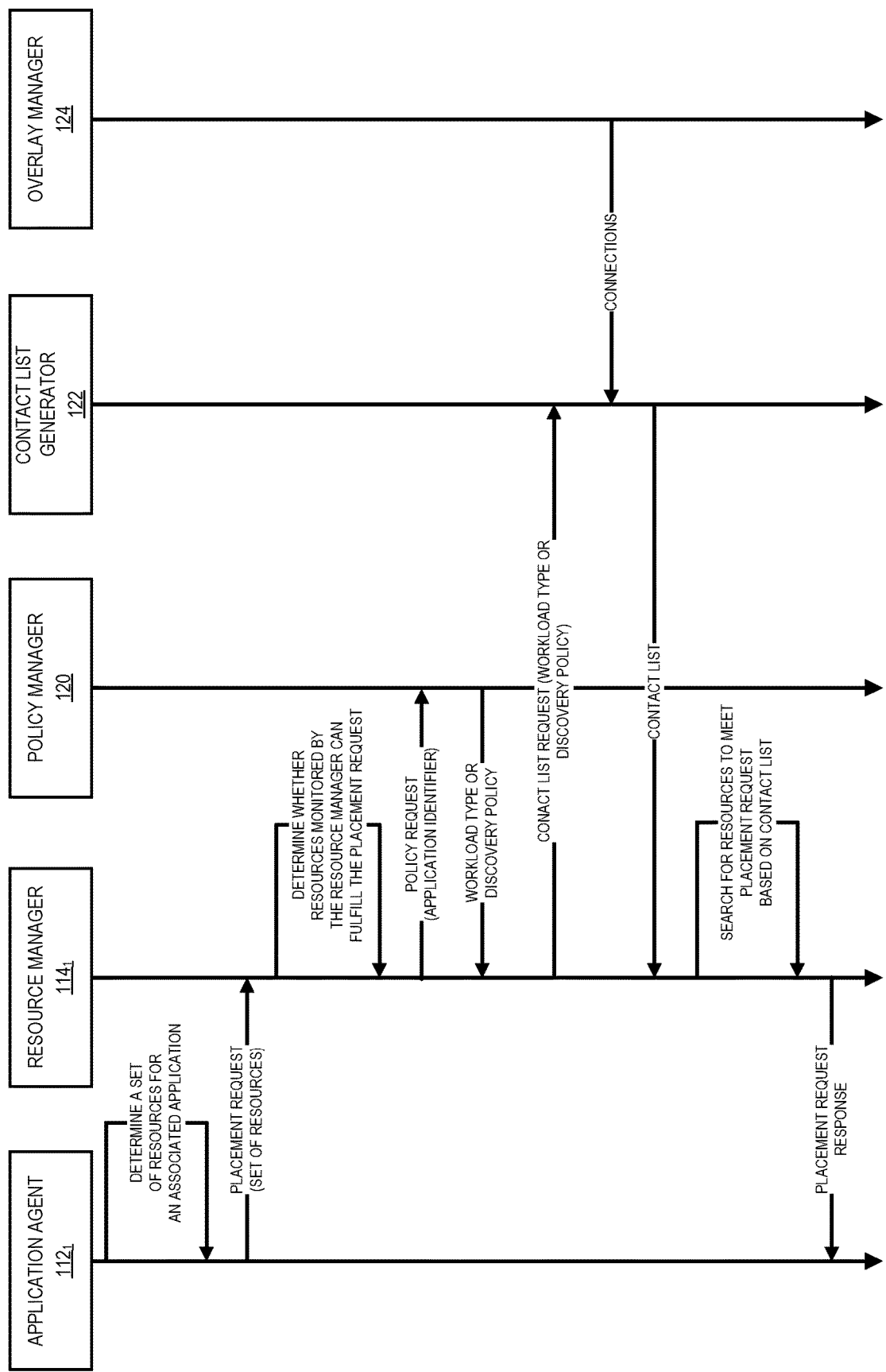
FIG. 3B shows a data flow diagram in which a resource manager, which originally received a placement request form an application agent, is unable to fulfill the placement request and relies on a set of other resource manager to fulfill the placement request, according to one example embodiment.

Conversely, in response to the resource manager $114_1$ determining at operation 206 that the servers $102_1$-$102_Z$ monitored by the resource manager $114_1$ cannot fulfill the placement request, the method 200 moves to operation 210. At operation 210, the resource manager $114_1$ transmits a policy request to the policy manager 120. For example, FIG. 3B shows the resource manager $114_1$ transmitting a policy request to the policy manager 120. The policy request indicates/references the application $110_1$ (e.g., an identifier for the application $110_1$) and requests a workload type or a discovery policy associated with the application $110_1$.

At operation 212, the policy manager 120 determines and transmits a workload type or a discovery policy associated with the application $110_1$ to the resource manager $114_1$ (as also shown in FIG. 3B). In some embodiments, the policy manager 120 may maintain a policy lookup table that is indexed by identifiers of applications 110. In these embodiments, the policy manager 120 determines a workload type or a discovery policy associated with the application $110_1$ by locating an entry in the policy lookup table associated with the identifier of the application $110_1$. As described above, a workload type or discovery policy may indicate how to select additional resource managers 114 to assist in fulfilling the placement request. For example, a discovery policy may indicate (1) the use of a small number of additional resource managers 114 (i.e., contacts), (2) the use of a large number of additional resource managers 114, (3) the use of a specific set of resources that correspond to a specific set of resource managers 114 (i.e., affinity rules), or (4) the restriction against use of a specific set of resources that correspond to a specific set of resource managers 114 (i.e., anti-affinity rules).

At operation 214, the resource manager $114_1$ transmits a contact list request to the contact list generator 122 (as also shown in FIG. 3B). The contact list request may indicate/reference the workload type or discovery policy received from the policy manager 120 and requests a contact list for use in fulfilling the placement request based on the workload type or discovery policy associated with the application $110_1$. Although described as the resource manager $114_1$ directly sending the contact list request to the contact list generator 122, in some embodiments, the policy manager 120 may transmit the contact list request to the contact list generator 122 in response to the placement request and following retrieval of the workload type or discovery policy associated with the application $110_1$.

Figure 4A:
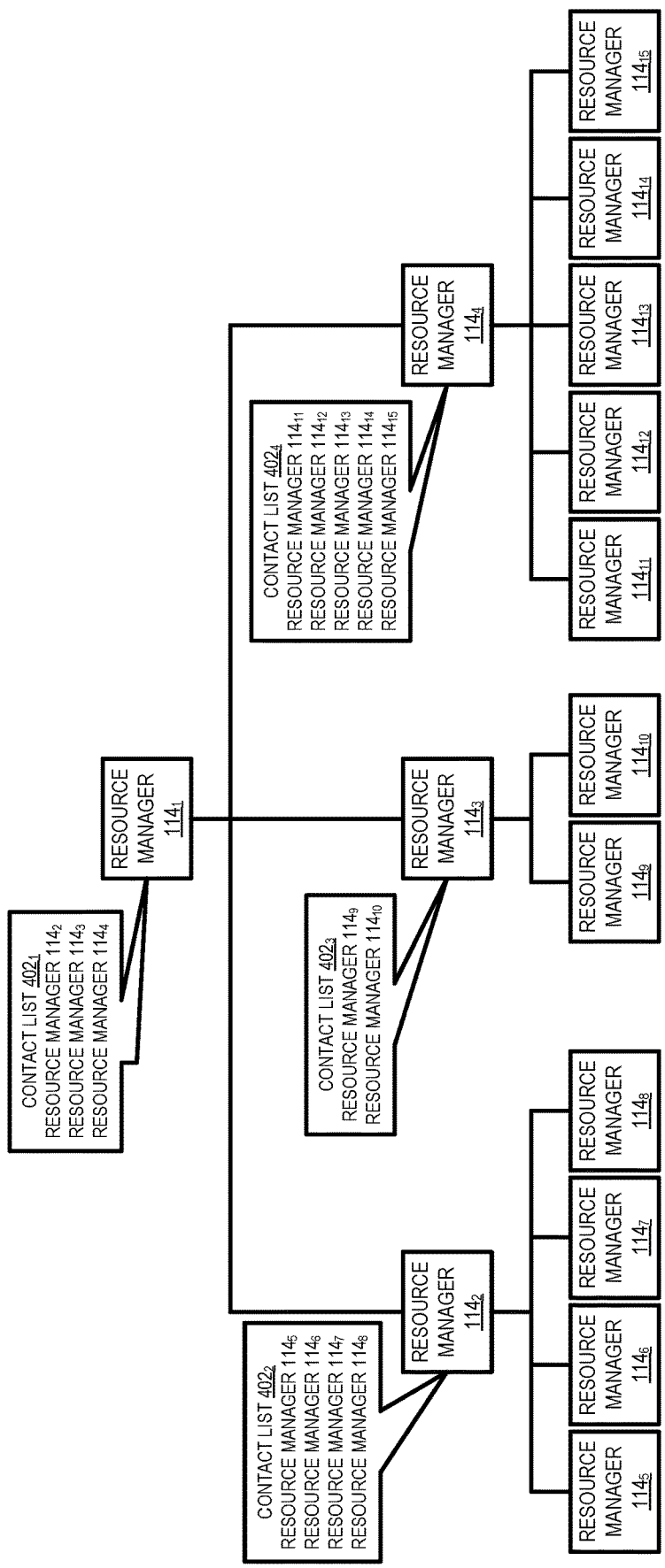
FIG. 4A shows a contact list generated for a resource manager in relation to a first workload type or discovery policy associated with an application, according to one example embodiment.
Figure 4B:
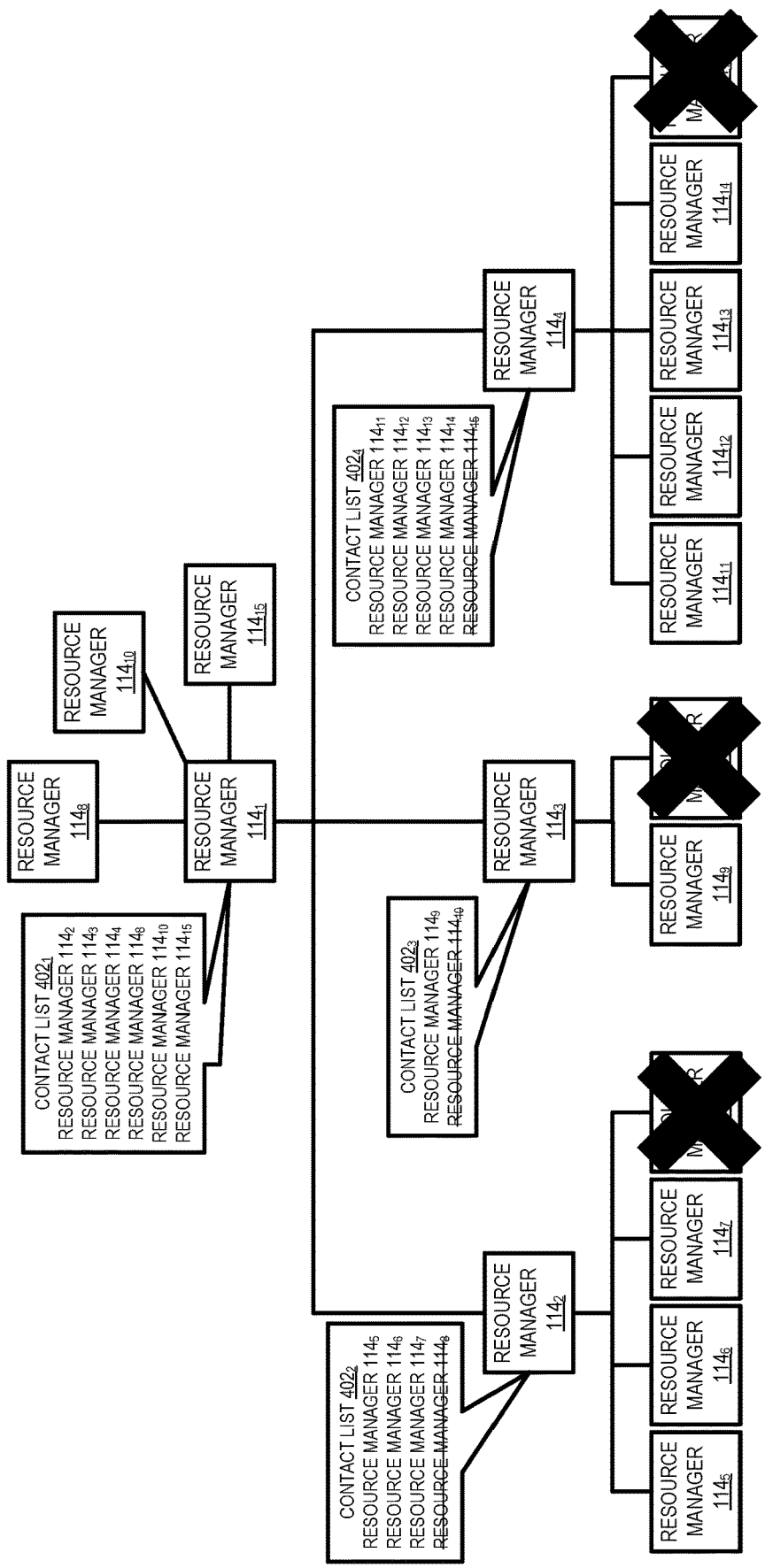
FIG. 4B shows a contact list generated for the resource manager in relation to a second workload type or discovery policy associated with the application, according to one example embodiment.

At operation 216, the contact list generator 122 generates and transmits to the resource manager $114_1$ a contact list for the application $110_1$ based on the workload type or discovery policy associated with the application $110_1$ (as also shown in FIG. 3B). The contact list generator 122 may generate the contact list based on connections in the datacenter system 100 indicated by the overlay manager 124. For example, FIG. 4A shows a contact list $402_1$ generated for the resource manager $114_1$ in relation to a first workload type or discovery policy associated with the application $110_1$. As shown in FIG. 4A, the contact list $402_1$ includes the resource managers $114_2$, $114_3$, and $114_4$. In another example embodiment shown in FIG. 4B, the contact list $402_1$ is altered based on a second workload type or discovery policy associated with the application $110_1$. As shown in FIG. 4B, the contact list $402_1$ includes the resource managers $114_2$, $114_3$, $114_4$, $114_8$, $114_{10}$, and $114_{15}$. Accordingly, the second workload type or discovery policy associated with the application $110_1$ caused the contact list $402_1$ to increase in size (i.e., the addition of the resource managers $114_8$, $114_{10}$, and $114_{15}$) in comparison to the first workload type or discovery policy.

As described above, contact lists 402 are application-specific (i.e., specific to the workload type or discovery policy associated with an application 110). Accordingly, as shown in FIG. 5, a first placement request $502_1$ corresponding to a first application $110_1$ (with a particular workload type or discovery policy) may correspond to a first contact list $402_{A1}$ for the resource manager $114_1$, including the resource managers $114_2$-$114_4$, while a second placement request $502_2$ corresponding to a second application $110_2$ (with a particular workload type or discovery policy) may correspond to a second contact list $402B_1$ for the resource manager $114_1$, including the resource managers $114_1$-$114_3$. As shown, the former case does not include the receiving resource manager $114_1$ in the contact list $402_{A1}$ (perhaps due to an anti-affinity policy), but the latter case includes the receiving resource manager $114_1$ in the contact list $402B_1$ (perhaps due to an affinity policy or local-first policy)

At operation 218, the resource manager $114_1$ searches using the contact list $402_1$ to determine resources to fulfill the placement request. In some embodiments, searching by the resource manager $114_1$ may include transmission of placement sub-requests to each resource manager 114 in the contact list $402_1$. The placement sub-requests may be identical to the original placement request from operation 204 or may indicate only a set of resources that the resource manager $114_1$ could not allocate/reserve using the servers $102A_1$-$102A_Z$. In response to these placement sub-requests, the resource managers 114 may perform the method 200. Namely, each of the resource managers 114 receiving the placement sub-requests may cause the contact list generator 122 to generate a corresponding contact list 402 in response to a failure to meet the corresponding placement sub-request locally (i.e., using locally monitored servers 102). For example, as shown in FIG. 4A, based on a first workload type or discovery policy, the contact list generator 122 generates contact list $402_2$ for resource manager $114_2$, which includes resource managers $114_5$, $114_6$, $114_7$, and $114_8$ as contacts; contact list $402_3$ for resource manager $114_3$, which includes resource managers $114_9$ and $114_{10}$ as contacts; and contact list $402_4$ for resource manager $114_4$, which includes resource managers $114_{11}$, $114_{12}$, $114_{13}$, $114_{14}$ and $114_{15}$ as contacts. In another example, as shown in FIG. 4B, based on a second workload type or discovery policy, the contact list generator 122 generates contact list $402_2$ for resource manager $114_2$ with resource manager $114_5$, $114_6$, and $114_7$ as contacts; contact list $402_3$ for resource manager $114_2$ with resource manager $114_9$ as a contact; and contact list $402_3$ for resource manager $114_3$ with resource managers $114_{11}$, $114_{12}$, $114_{13}$, and $114_{14}$ as contacts. The method 200 may again be recursively performed for contacts in the contact lists $402_2$-$402_4$ until (1) resources are successfully identified to meet the original placement request from operation 204 or (2) the search for resources is determined to be unsuccessful based on either expiration of a timer or an iterative count threshold being reached.

In response to a successful search, the method 200 may move to operation 208 for corresponding resource managers 114 to reserve identified resources in the corresponding servers 102 and transmit a placement request response to the application agent $112_1$. In response to an unsuccessful search, the method 200 may similarly move to operation 208 to inform the application agent $112_1$ of the unsuccessful search.

As described above, the datacenter system 100 is based on a decentralized management framework, comprising a collection of collaborative resource managers 114 that is each associated with a set of resource units (e.g., a set of cores/processors, segments of memory, servers 102, racks 104, etc.). In such a system 100, each distributed resource manager 114 does not rely on a unique global view of the datacenter system 100. Instead, each resource manager 114 maintains a local view of its environment and uses its local view to make local decisions regarding resource unit assignment/reservation/allocation. Each resource manager 114 may also rely on a logical overlay for resource unit assignment/reservation/allocation that is based on a collaboration between resource managers 114. The logical overlay defines and establishes the connectivity between the resource managers 114 and acts as a communication graph between the resource managers 114. Each resource manager 114, at a given time, only knows about a set of other resource managers 114 defined by a contact list, which is generated based on a workload type or policy of an application 110 and, optionally, an objective of the datacenter system 100. Resource managers 114 logically connected to each other shape a neighborhood, which is an alternative to the static partitions used by centralized controllers. The grouping of resource managers 114 enables seamless pooling of the resources to applications 110 with resource requirements larger than resources in a single server 102 or a single resource manager 114.

Figure 6:
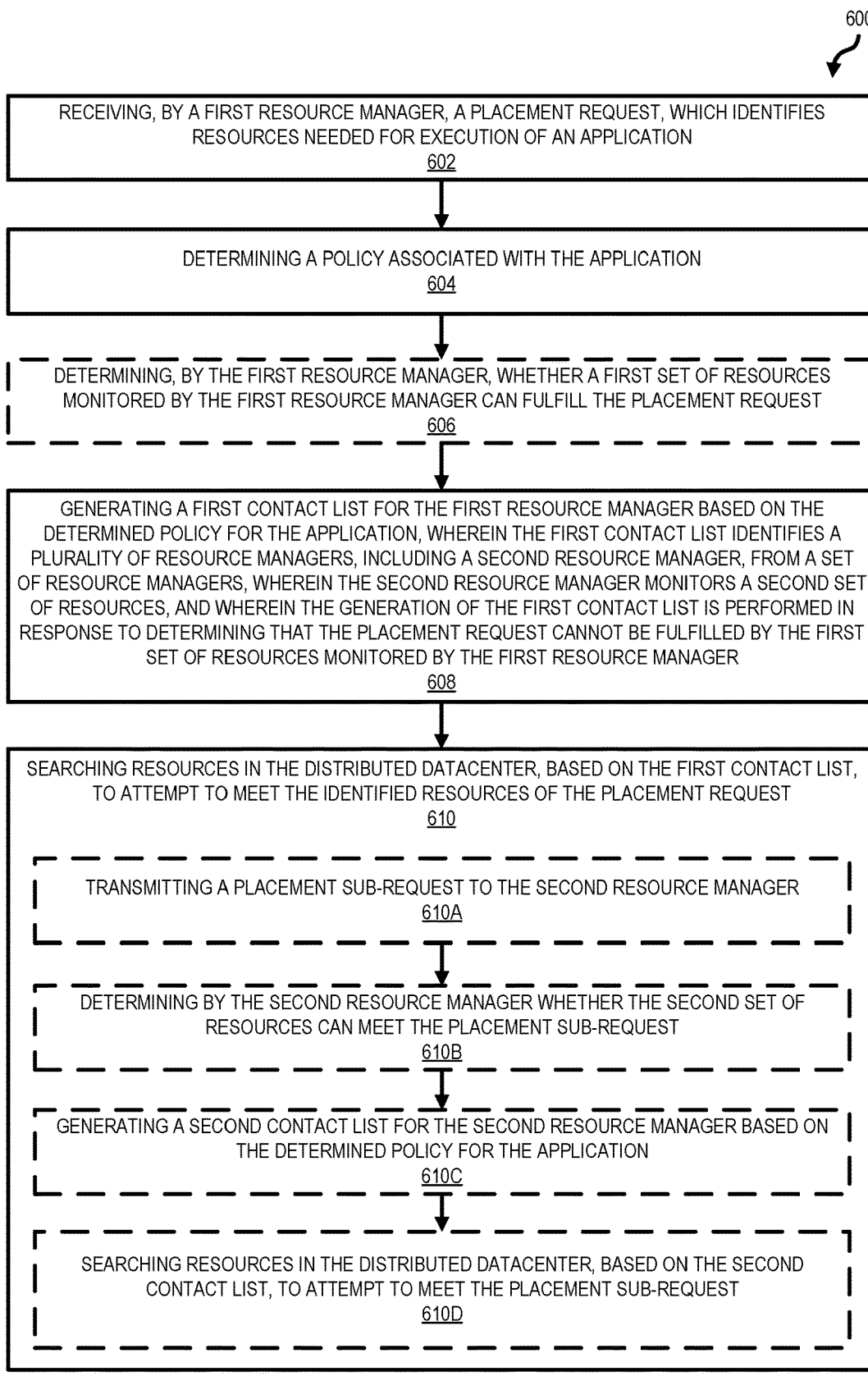
FIG. 6 shows another flow diagram, which describes a method for allocating resources to applications based on generated contact lists, according to one example embodiment.

Turning now to FIG. 6, a flow diagram which describes a method 600 for allocating resources to applications based on generated contact lists will be described, according to another example embodiment. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The method 600 may commence at operation 602 with a first resource manager $114_1$ receiving a placement request 502, which identifies resources needed for execution of an application $110_1$.

At operation 604, the first resource manager $114_1$ may determine, in conjunction with one or more elements of the placement services 118, a policy associated with the application $110_1$.

At operation 606, the first resource manager $114_1$ may determine whether a first set of resources monitored by the first resource manager $114_1$ can fulfill the placement request 502.

At operation 608, the placement services 118 (e.g., the contact list generator 122) may generate a first contact list 402 for the first resource manager $114_1$ based on the determined policy for the application $110_1$, wherein the first contact list 402 identifies a plurality of resource managers 114, including a second resource manager $114_2$, from a set of resource managers $114_1$-$114_4$, wherein the second resource manager $114_2$ monitors a second set of resources, and wherein the generation of the first contact list 402 is performed in response to determining that the placement request 502 cannot be fulfilled by the first set of resources monitored by the first resource manager $114_1$. In one embodiment, the first set of resources and the second set of resources each includes one or more servers 102, one or more racks 102 of servers 104, one or more processors, or one or more segments or memory. In some embodiments, the policy of the application $110_1$ indicates which resource managers 114 from the set of resource managers $114_1$-$114_4$ should be included in the first contact list 402. For example, the policy of the application $110_1$ may indicate to select above a first threshold number of resource managers 114 for the first contact list 402, to select below a second threshold number of resource managers 114 for the first contact list 402, to select resource managers 114 to include in the first contact list 402 that monitor a specified type of resource, or to exclude a specified resource manager 114 from the first contact list 402.

At operation 610, the resource managers 114 and/or the placement services 118 search resources in the distributed datacenter 100, based on the first contact list 402, to attempt to meet the identified resources of the placement request 502. This searching may include sub-operations 610A-610D. In particular, at sub-operation 610A, the first resource manager $114_1$ transmits a placement sub-request to the second resource manager 114$_2$. At sub-operation 610B, the second resource manager 114$_2$ determines whether the second set of resources can meet the placement sub-request. At sub-operation 610C the placement services 118 generate a second contact list 402 for the second resource manager 114$_2$ based on the determined policy for the application 110$_1$. At sub-operation 610D, the resource managers 114 search resources in the distributed datacenter 100, based on the second contact list 402, to attempt to meet the placement sub-request.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
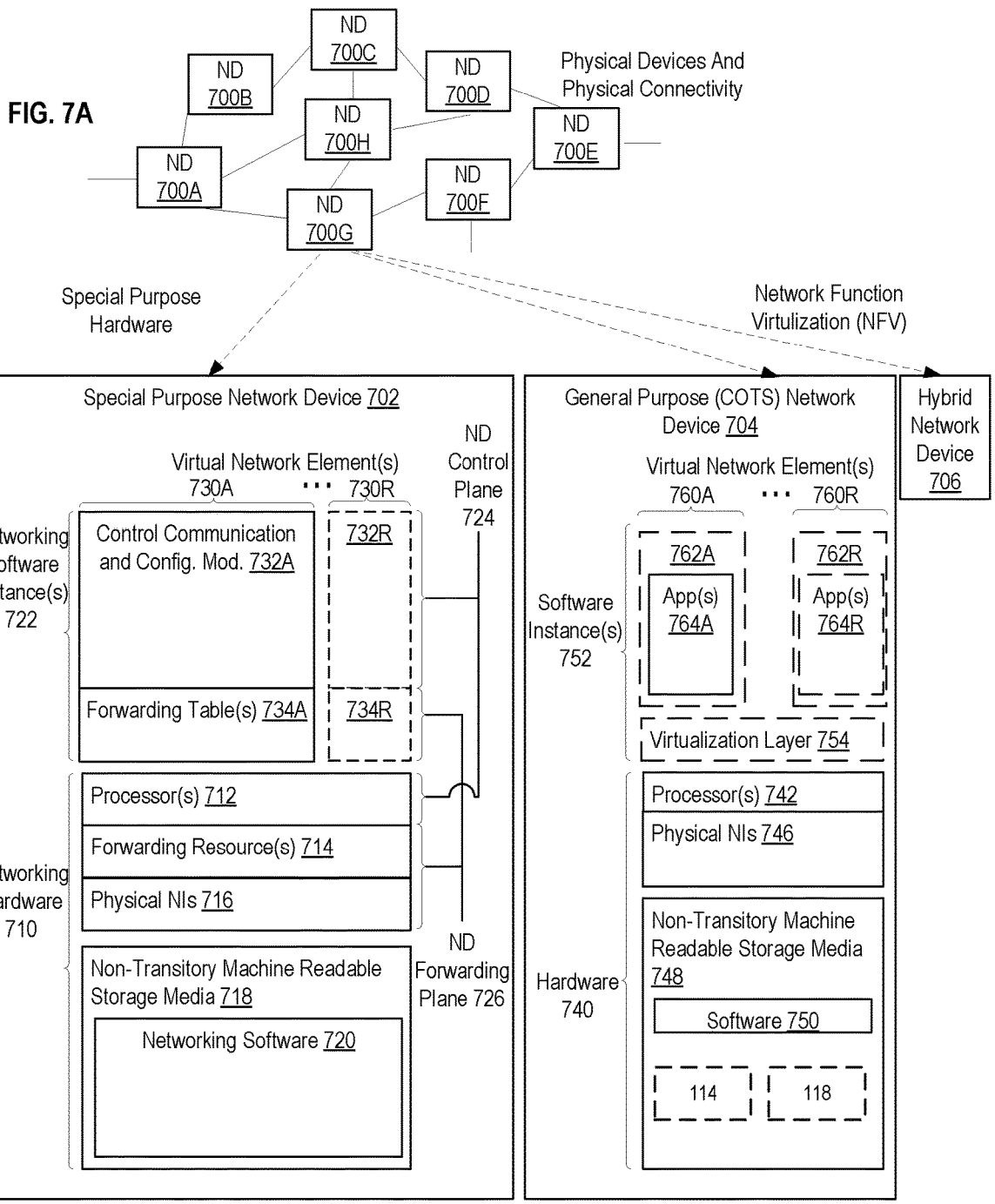
FIG. 7A illustrates connectivity between network devices (NDs) within an exemplary network, as well as three exemplary implementations of the NDs, according to some embodiments.

FIG. 7A illustrates connectivity between network devices (NDs) within an exemplary network, as well as three exemplary implementations of the NDs, according to some embodiments. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
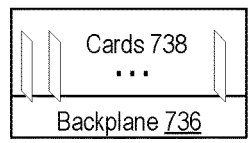
FIG. 7B illustrates an exemplary way to implement a special-purpose network device according to some embodiments.

FIG. 7B illustrates an exemplary way to implement the special-purpose network device 702 according to some embodiments. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750, a resource manager 114, and/or placement services 118. During operation, the processor(s) 742 execute the software 750, a resource manager 114, and/or placement services 118 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
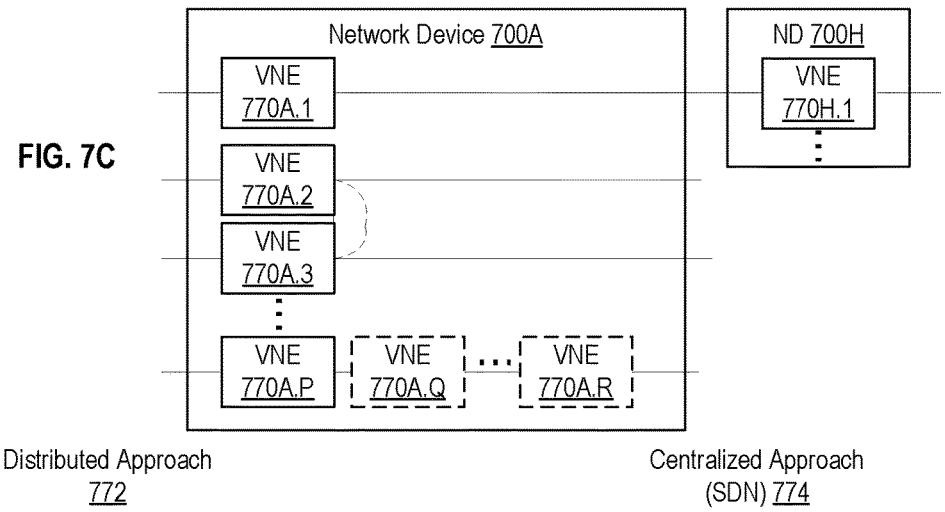
FIG. 7C illustrates various exemplary ways in which virtual network elements (VNEs) may be coupled according to some embodiments.

FIG. 7C illustrates various exemplary ways in which VNEs may be coupled according to some embodiments. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
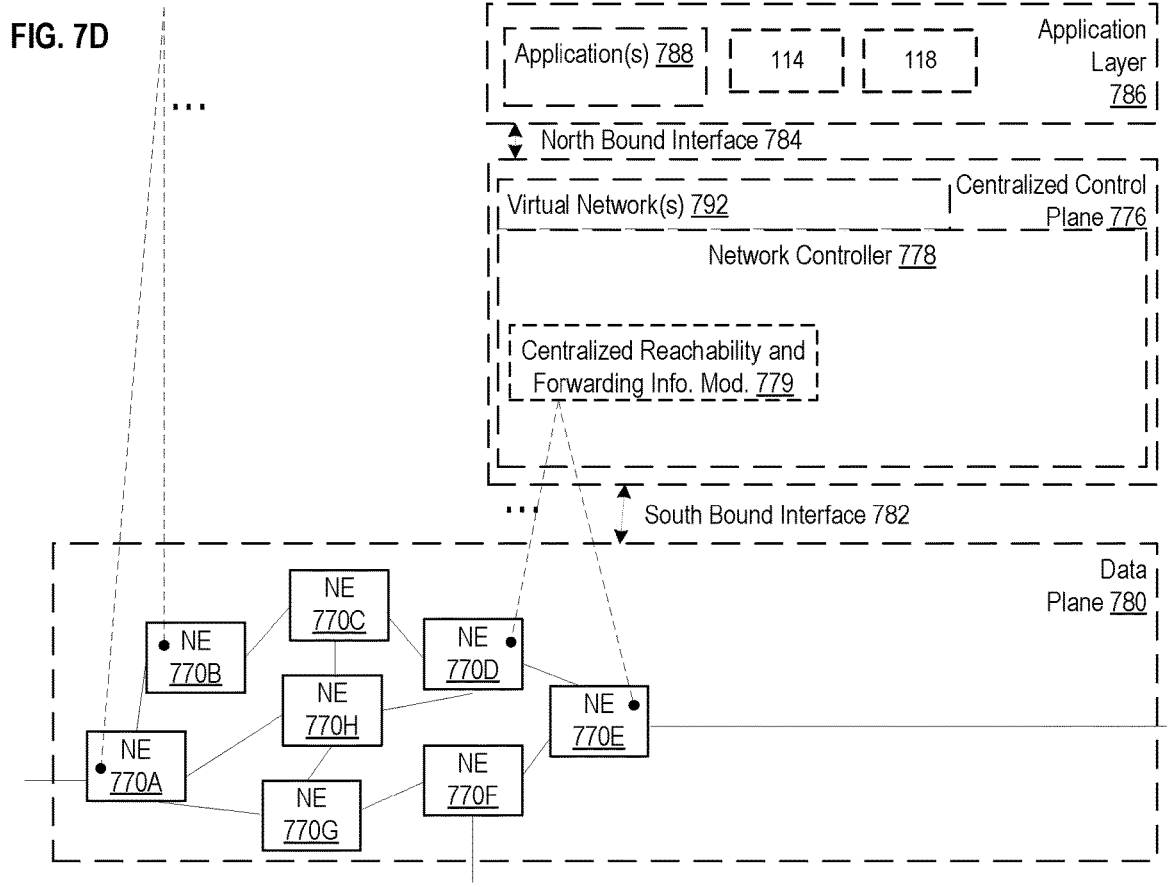
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788, a resource manager 114, and/or placement services 118. The centralized control plane 776 has the ability to form virtual networks 792 (sometimes referred to as a logical forwarding plane, network services, or overlay networks (with the NEs 770A-H of the data plane 780 being the underlay network)) for the application(s) 788, a resource manager 114, and/or placement services 118. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
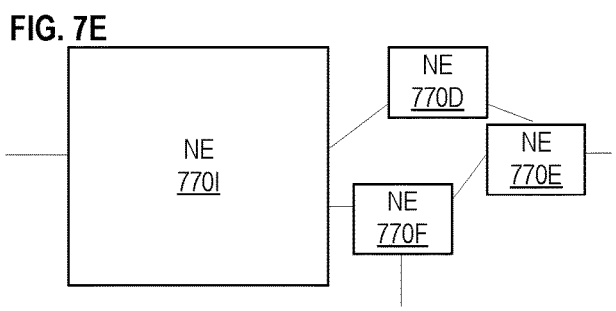
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
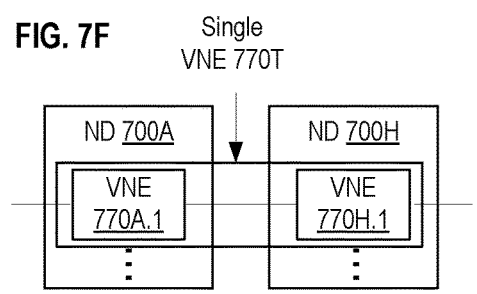
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments. Thus, the abstraction of a NE or VNE can span multiple NDs.

While some embodiments implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
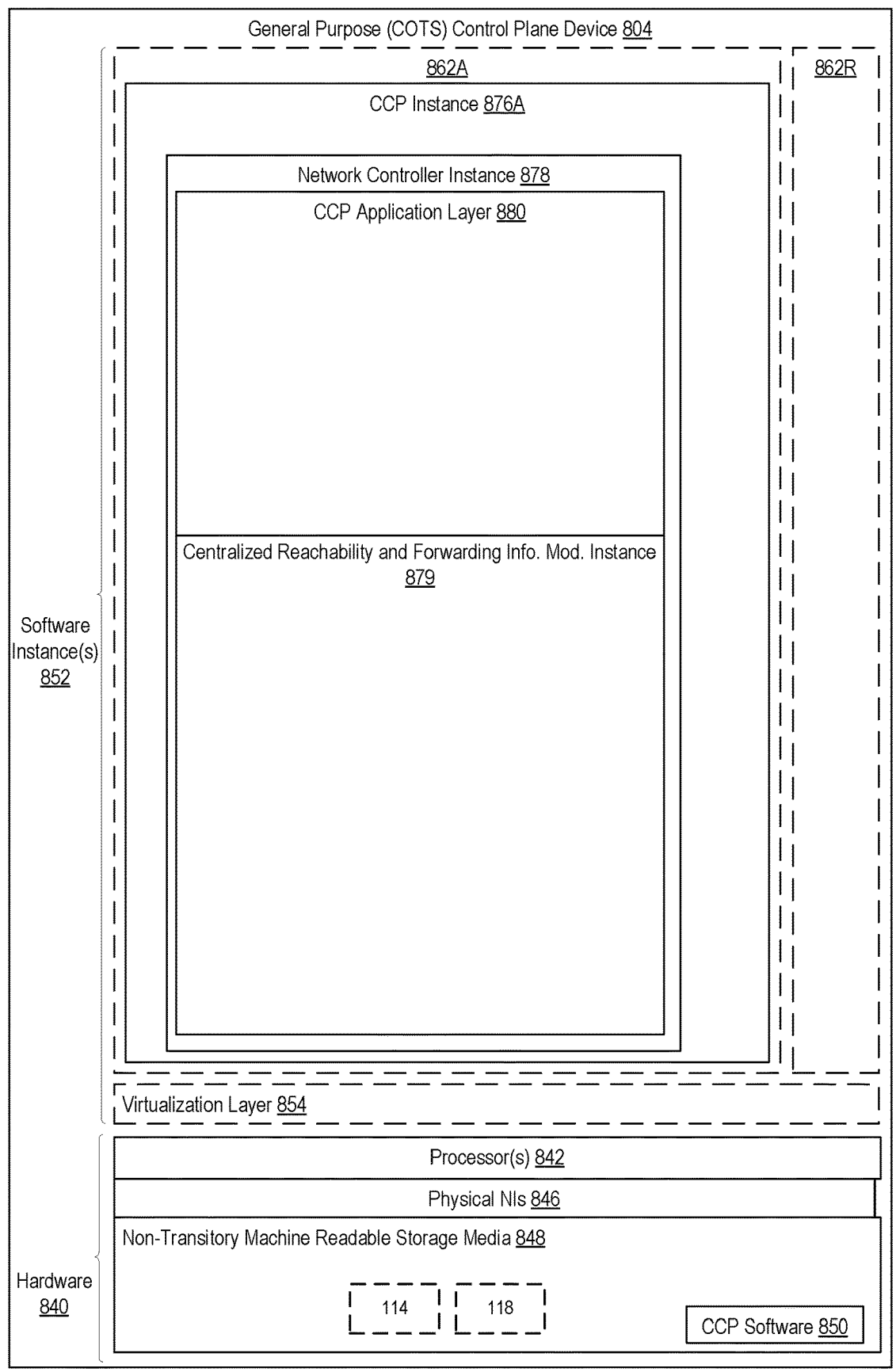
FIG. 8 illustrates a general purpose control plane device with centralized control plane (CCP) software 850, according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850, a resource manager 114, and/or placement services 118.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs and for processing resource managers 114 and/or placement services 118), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDsNEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+(Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   in response to a first resource manager of a plurality of resource managers in a distributed datacenter receiving a placement request from an application which identifies resources needed for execution of the application, the distributed datacenter performing the following:
      determining a policy associated with the application, wherein the application includes a plurality of processes, and wherein the policy comprises an anti-affinity rule indicating that two or more processes of the plurality of processes cannot be executed on a same resource;
      generating a first contact list for the first resource manager based on the placement request and the determined policy for the application, wherein the first contact list identifies resource managers from the plurality of resource managers in the distributed datacenter, and wherein resources of the identified resource managers are searchable by the first resource manager;
      searching resources managed by the first resource manager and the identified resource managers to meet the identified resources of the placement request, wherein the number of identified resource managers is determined to decrease a scheduling latency of the searching to satisfy a scheduling requirement of the application;
      determining, in response to the searching, that there are found resources that meet the identified resources of the placement request; and
      allocating the found resources to the application, in response to determining that there are found resources that meet the identified resources of the placement request, wherein the application executes using the allocated resources.

2. The method of claim 1, wherein the identified resources are associated with execution of the application in the distributed datacenter to meet one or more requirements of a service level agreement.

3. The method of claim 1, further comprising:
   determining, by the first resource manager, whether a first set of resources monitored by the first resource manager can fulfill the placement request,
   wherein the generation of the first contact list is performed in response to determining that the placement request cannot be fulfilled by the first set of resources monitored by the first resource manager.

4. The method of claim 3, wherein the identified resource managers include a second resource manager and the second resource manager monitors a second set of resources.

5. The method of claim 4, wherein the first set of resources and the second set of resources each includes one or more servers, one or more racks of servers, one or more processors, or one or more segments of memory.

6. The method of claim 4, wherein the searching the resources in the distributed datacenter comprises:
   transmitting a placement sub-request to the second resource manager;
   determining by the second resource manager whether the second set of resources can meet the placement sub-request;
   generating a second contact list for the second resource manager based on the determined policy for the application, wherein the generation of the second contact list is performed in response to determining that the placement sub-request cannot be fulfilled by the second set of resources monitored by the second resource manager; and
   searching resources in the distributed datacenter, based on the second contact list, to meet the placement sub-request.

7. The method of claim 1, wherein the policy of the application further indicates which resource managers of the plurality of resource managers to include in the first contact list.

8. The method of claim 7, wherein the policy of the application further indicates to select above a first threshold number of resource managers for the first contact list, to select below a second threshold number of resource managers for the first contact list, to select resource managers to include in the first contact list that monitor a specified type of resource, or to exclude a specified resource manager from the first contact list.

9. A non-transitory machine-readable storage medium that provides instructions that, when executed by a processor, will cause said processor to perform operations comprising:
   in response to a first resource manager of a plurality of resource managers in a distributed datacenter receiving a placement request from an application which identifies resources needed for execution of the application, the processor performing the following;
      determining a policy associated with the application, wherein the application includes a plurality of processes, and wherein the policy comprises an anti-affinity rule indicating that two or more processes of the plurality of processes cannot be executed on a same resource;
      generating a first contact list for a first resource manager based on the placement request and the determined policy for the application, wherein the first contact list identifies resource managers from the plurality of resource managers in the distributed datacenter, and wherein resources of the identified resource managers are searchable by the first resource manager;
      searching resources managed by the first resource manager and the identified resource managers to meet the identified resources of the placement request, wherein the number of identified resource managers is determined to decrease a scheduling latency of the searching to satisfy a scheduling requirement of the application;
      determining, in response to the searching, that there are found resources that meet the identified resources of the placement request; and
      allocating the found resources to the application, in response to determining that there are found resources that meet the identified resources of the placement request, wherein the application executes using the allocated resources.

10. The non-transitory machine-readable storage medium of claim 9, wherein the identified resources are associated with execution of the application in the distributed datacenter to meet one or more requirements of a service level agreement.

11. The non-transitory machine-readable storage medium of claim 9, wherein the operations further comprise:
    determining whether a first set of resources monitored by the first resource manager can fulfill the placement request,
    wherein the generation of the first contact list is performed in response to determining that the placement request cannot be fulfilled by the first set of resources monitored by the first resource manager.

12. The non-transitory machine-readable storage medium of claim 11, wherein the identified resource managers include a second resource manager and the second resource manager monitors a second set of resources.

13. The non-transitory machine-readable storage medium of claim 12, wherein the first set of resources and the second set of resources each includes one or more servers, one or more racks of servers, one or more processors, or one or more segments of memory.

14. The non-transitory machine-readable storage medium of claim 12, wherein the searching the resources in the distributed datacenter comprises:
    transmitting a placement sub-request to the second resource manager;
    determining by the second resource manager whether the second set of resources can meet the placement sub-request;
    generating a second contact list for the second resource manager based on the determined policy for the application, wherein the generation of the second contact list is performed in response to determining that the placement sub-request cannot be fulfilled by the second set of resources monitored by the second resource manager; and
    searching resources in the distributed datacenter, based on the second contact list, to meet the placement sub-request.

15. The non-transitory machine-readable storage medium of claim 9, wherein the policy of the application further indicates which resource managers of the plurality of resource managers to include in the first contact list.

16. The non-transitory machine-readable storage medium of claim 15, wherein the policy of the application further indicates to select above a first threshold number of resource managers for the first contact list, to select below a second threshold number of resource managers for the first contact list, to select resource managers to include in the first contact list that monitor a specified type of resource, or to exclude a specified resource manager from the first contact list.

17. A system comprising:
    a memory unit that stores instructions; and
    a processor coupled to the memory unit to execute the instructions, wherein the instructions are to cause the system to:
       in response to a first resource manager of a plurality of resource managers in a distributed datacenter receiving a placement request from an application which identifies resources needed for execution of the application, the system to perform the following:
          determine a policy associated with the application, wherein the application includes a plurality of processes, and wherein the policy comprises an anti-affinity rule indicating that two or more processes of the plurality of processes cannot be executed on a same resource;
          generate a first contact list for a first resource manager based on the placement request and the determined policy for the application, wherein the first contact list identifies resource managers from the plurality of resource managers in the distributed datacenter, and wherein resources of the identified resource managers are searchable by the first resource manager;
          search resources managed by the first resource manager and the identified resource managers to meet the identified resources of the placement request, wherein the number of identified resource managers is determined to decrease a scheduling latency of the searching to satisfy a scheduling requirement of the application;
          determine, in response to the searching, that there are found resources that meet the identified resources of the placement request; and
          allocate the found resources to the application, in response to determining that there are found resources that meet the identified resources of the placement request, wherein the application executes using the allocated resources.

18. The system of claim 17, wherein the identified plurality of resource managers include a second resource manager,
  wherein the second resource manager monitors a second set of resources, and
  wherein the searching the resources in the distributed datacenter comprises:
    transmitting a placement sub-request to the second resource manager;
    determining by the second resource manager whether the second set of resources can meet the placement sub-request;
    generating a second contact list for the second resource manager based on the determined policy for the application, wherein the generation of the second contact list is performed in response to determining that the placement sub-request cannot be fulfilled by the second set of resources monitored by the second resource manager; and
    searching resources in the distributed datacenter, based on the second contact list, to meet the placement sub-request.

19. The system of claim 17, wherein the identified resources are associated with execution of the application in the distributed datacenter to meet one or more requirements of a service level agreement.

20. The system of claim 17, wherein the instructions further cause the system to:
  determine, by the first resource manager, whether a first set of resources monitored by the first resource manager can fulfill the placement request,
  wherein the generation of the first contact list is performed in response to determining that the placement request cannot be fulfilled by the first set of resources monitored by the first resource manager.

* * * * *